(12) United States Patent
Deng et al.

(10) Patent No.: US 11,681,810 B2
(45) Date of Patent: Jun. 20, 2023

(54) TRAVERSING SOFTWARE COMPONENTS AND DEPENDENCIES FOR VULNERABILITY ANALYSIS

(71) Applicant: International Business Machines Corporation, Armonk, NY (US)

(72) Inventors: Yu Deng, Yorktown Heights, NY (US); Tara Astigarraga, Fairport, NY (US); Jens Rathgeber, Glashuetten (DE); John Joseph Bird, Rochester, MN (US); Soumitra Sarkar, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 17/222,345

(22) Filed: Apr. 5, 2021

(65) Prior Publication Data
US 2022/0318396 A1 Oct. 6, 2022

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .................. G06F 21/577; G06F 2221/033
See application file for complete search history.

(56) References Cited

U.S. PATENT DOCUMENTS

| | | |
|---|---|---|
| 6,847,970 B2 | 1/2005 | Keller et al. |
| 7,284,274 B1 | 10/2007 | Walls et al. |
| 8,789,192 B2 | 7/2014 | LaBumbard et al. |
| 9,690,553 B1 | 6/2017 | Brodie et al. |
| 10,387,940 B2 | 8/2019 | Akkiraju et al. |
| 10,205,735 B2 | 12/2019 | Apostolopoulos |
| 10,542,015 B2 | 1/2020 | Bird et al. |
| 10,681,061 B2 | 6/2020 | Jang et al. |

(Continued)

OTHER PUBLICATIONS

Predicting Vulnerable Software Components through N-gram Analysis and Statistical Feature Selection by Pang et al., published 2015 (Year: 2015).*

(Continued)

*Primary Examiner* — Vu V Tran
(74) *Attorney, Agent, or Firm* — Amin, Turocy & Watson, LLP

(57) ABSTRACT

Systems, devices, computer-implemented methods, and/or computer program products that facilitate software vulnerability analysis using relationship data extracted from disparate package-related sources. In one example, a system can comprise a processor that executes computer executable components stored in memory. The computer executable components can comprise a knowledge induction component and a vulnerability component. The knowledge induction component can populate a package ontology for a range of packages with relationship data extracted from a plurality of disparate package-related sources. The vulnerability component can identify an implicit vulnerability impacting the range of packages using the package ontology and a vulnerability record regarding an explicit vulnerability for a package within the range of packages.

20 Claims, 7 Drawing Sheets

(56) References Cited

U.S. PATENT DOCUMENTS

| | | | |
|---|---|---|---|
| 2008/0082380 A1* | 4/2008 | Stephenson | G06Q 10/06 726/25 |
| 2014/0337974 A1* | 11/2014 | Joshi | H04L 63/1425 726/23 |
| 2016/0065599 A1* | 3/2016 | Hovor | H04L 67/10 726/23 |
| 2016/0080422 A1 | 3/2016 | Belgodere et al. | |
| 2019/0394225 A1 | 12/2019 | Vajipayajula et al. | |
| 2020/0210590 A1* | 7/2020 | Doyle | G06F 8/77 |
| 2020/0320340 A1* | 10/2020 | Wentz | G06F 9/465 |
| 2021/0021611 A1* | 1/2021 | Hewlett, II | H04L 63/1425 |
| 2022/0019659 A1* | 1/2022 | Salem | G06F 21/566 |

OTHER PUBLICATIONS

Walden et al., "Idea: Measuring the Effect of Code Complexity on Static Analysis Results," F. Massacci, S.T. Redwine Jr., and N. Zannone (Eds.): ESSoS 2009, LNCS 5429, pp. 195-199, 2009.

Osorio et al., Towards reproducibility of computational environments for Scientific Experiments using Container-based virtualization. CEUR Workshop Proceedings. 2018, 8 pages.

Hossucu, "Semantic concept recognition from structured and unstructured inputs within cyber security domain," MS thesis. Middle East Technical University, 2015, 112 pages.

Nist—National Vulnerability Database, "CVE-2018-15756 Detail," https://nvd.nist.gov/vuln/detail/CVE-2018-15756, 1 page.

"ScanCode Toolkit Documentation," https://scancode-toolkit.readthedocs.io, 4 pages.

* cited by examiner

| Package ABC Enterprise Version | Package GHI Version |
|---|---|
| Package ABC Enterprise 5.0 | Package ABC Home 6.1 |
| Package ABC Enterprise 5.1 | Package ABC Home 6.2 |
| Package ABC Enterprise 5.2 | Package ABC Home 6.3 |
| Package ABC Enterprise 5.3 | Package ABC Home 6.4 |
| Package ABC Enterprise 5.4 | Package ABC Home 6.5 |
| Package ABC Enterprise 6.0 | Package GHI 9 |
| Package ABC Enterprise 6.1 | Package GHI 10 |
| Package ABC Enterprise 6.2 | Package GHI 14 |
| Package ABC Enterprise 6.3 | Package GHI 19 |

ranges, or with wide ranges that overlap, or both, for a denial of service attack. This vulnerability affects applications that depend on either (Component-A) or (Component-B). Such applications must also have a registration for serving static resources (e.g. JS, CSS, images, and others), or have an annotated controller that returns an JKLframework.core.io.Resource. (Component-C) applications that depend on (Component-D) or (Component-E) are ready to serve static resources out of the box and are therefore vulnerable.

FIG. 3

CVE-1999-0040

"Package":"AIX 3.2", ⟵710  ⟵722   ⟵724
"TEXT":"Buffer overflow in
Xt library of X Windowing System
allows local users to execute
commands with root privileges."

CVE-2012-0195

"Package":
("tivoli_asset_management_for_it 7.2",)   ⟵810
"TEXT":"Cross-site scripting (XSS)
vulnerability in the   ⟵822 824
Start Center Layout and Configuration
component in IBM Maximo Asset Management
and Asset Management Essentials 6.2, 7.1,
and 7.5; IBM Tivoli Asset Management for
IT 6.2, 7.1, and 7.2; IBM Tivoli Service
Request Manager 7.1 and 7.2; IBM Maximo
Service Desk 6.2; and IBM Tivoli Change
and Configuration Management Database
(CCMDB) 6.2, 7.1, and 7.2 allows remote
attackers to inject arbitrary web script
or HTML via the display name."

FIG. 8

TRAVERSING SOFTWARE COMPONENTS AND DEPENDENCIES FOR VULNERABILITY ANALYSIS

BACKGROUND

One or more embodiments herein relate to computing devices, and more specifically, to systems, devices, computer-implemented methods, and/or computer program products that facilitate software vulnerability analysis using relationship data extracted from disparate package-related sources.

Organizations such as Global 500 companies can use custom software packages and other software packages that depend on components originating from various external sources. Such software dependencies can often represent a substantial attack surface of an organization's computing environment. Popular sources of vulnerability information, such as the National Vulnerability Database (NVD) managed by the National Institute of Standards and Technology (NIST), can provide fragmented vulnerability information at the package-level. The responsibility to understand and patch dependencies for externally sourced components within a custom software package largely falls on development teams creating and maintaining code bases for such software packages.

A development team generally considers multiple dependency levels when using externally sourced components. Those dependency levels can include, but are not limited to: security/vulnerability dependencies; regulatory dependencies; standards/best practice dependencies; and/or architectural dependencies. Those dependency levels can further include hidden dependencies arising from release dependencies (e.g., code and version dependencies), inter-package dependencies, cloud dependencies, and other hidden dependencies.

Generally, development teams implement dependency checks at the Continuous Integration (CI) build phase. This can be problematic, as many custom software packages can be deployed into an existing environment, such as an information technology (IT) environment, where other software can already be in use. In some instances, additional dependencies can arise when custom software packages utilize external software packages for functionalities, such as messaging and/or handling stream data. Dependencies can also exist between a custom software package and underlying software like operating systems, virtualization and automation software, and/or middleware components. Once a custom software package is in production, dependency checks can often be done ad hoc, manually, or not at all. A substantial number of IT incidents in a defined computing environment (e.g., a managed IT environment) in which custom software packages are used can be related to dependency issues.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate software vulnerability analysis using relationship data extracted from disparate package-related sources are described.

According to an embodiment, a system can comprise a processor that executes computer executable components stored in memory. The computer executable components can comprise a knowledge induction component and a vulnerability component. The knowledge induction component can populate a package ontology for a range of packages with relationship data extracted from a plurality of disparate package-related sources. The vulnerability component can identify an implicit vulnerability impacting the range of packages using the package ontology and a vulnerability record regarding an explicit vulnerability for a package within the range of packages. One aspect of such a system is that the system can facilitate software vulnerability analysis using relationship data extracted from disparate package-related sources.

In an embodiment, the knowledge induction component can populate the package ontology with the relationship data by evaluating vulnerability descriptive data to identify sentences that reference terms indicative of vulnerabilities. One aspect of such a system is that the system can facilitate increasing computational efficiency by reducing a volume of descriptive data that is evaluated to extract relationship data.

According to another embodiment, a computer-implemented method can comprise populating, by a system operatively coupled to a processor, a package ontology for a range of packages with relationship data extracted from a plurality of disparate package-related sources. The computer-implemented method can further comprise identifying, by the system, an implicit vulnerability impacting the range of packages using the package ontology and a vulnerability record regarding an explicit vulnerability for a package within the range of packages. One aspect of such a computer-implemented method is that the method can facilitate software vulnerability analysis using relationship data extracted from disparate package-related sources.

In an embodiment, the system can populate the package ontology with the relationship data by evaluating sentences of vulnerability descriptive data to identify basic entities. In an embodiment, the sentences of vulnerability descriptive data can comprise terms indicative of vulnerabilities. One aspect of such a computer-implemented method is that the method can facilitate identifying particular components of a package that are actually impacted by a vulnerability identified as impacting the package at large.

According to another embodiment, a computer program product can comprise a computer readable storage medium having program instructions embodied therewith. The program instructions are executable by a processor to cause the processor to perform operations. The operations can include populating, by the processor, a package ontology for a range of packages with relationship data extracted from a plurality of disparate package-related sources. The operations can further include identifying, by the processor, an implicit vulnerability impacting the range of packages using the package ontology and a vulnerability record regarding an explicit vulnerability for a package within the range of packages. One aspect of such a computer program product is that the computer program product can facilitate software vulnerability analysis using relationship data extracted from disparate package-related sources.

In an embodiment, the processor can populate the package ontology with the relationship data by concatenating continuous sequences of noun phrases and identified basic entities within sentences of vulnerability descriptive data to build candidate N-gram entities. In an embodiment, the sentences of vulnerability descriptive data can comprise terms indicative of vulnerabilities. One aspect of such a computer program product is that the computer program product can facilitate reducing a likelihood of missing actual components of a given package in natural language text describing a vulnerability.

DESCRIPTION OF THE DRAWINGS

FIG. 2 illustrates an example, non-limiting mapping between different software package versions, in accordance with one or more embodiments described herein.

FIG. 3 illustrates example, non-limiting vulnerability descriptive data, in accordance with one or more embodiments described herein.

FIG. 7 illustrates an example, non-limiting vulnerability record, in accordance with one or more embodiments described herein.

FIG. 8 illustrates another example, non-limiting vulnerability record, in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
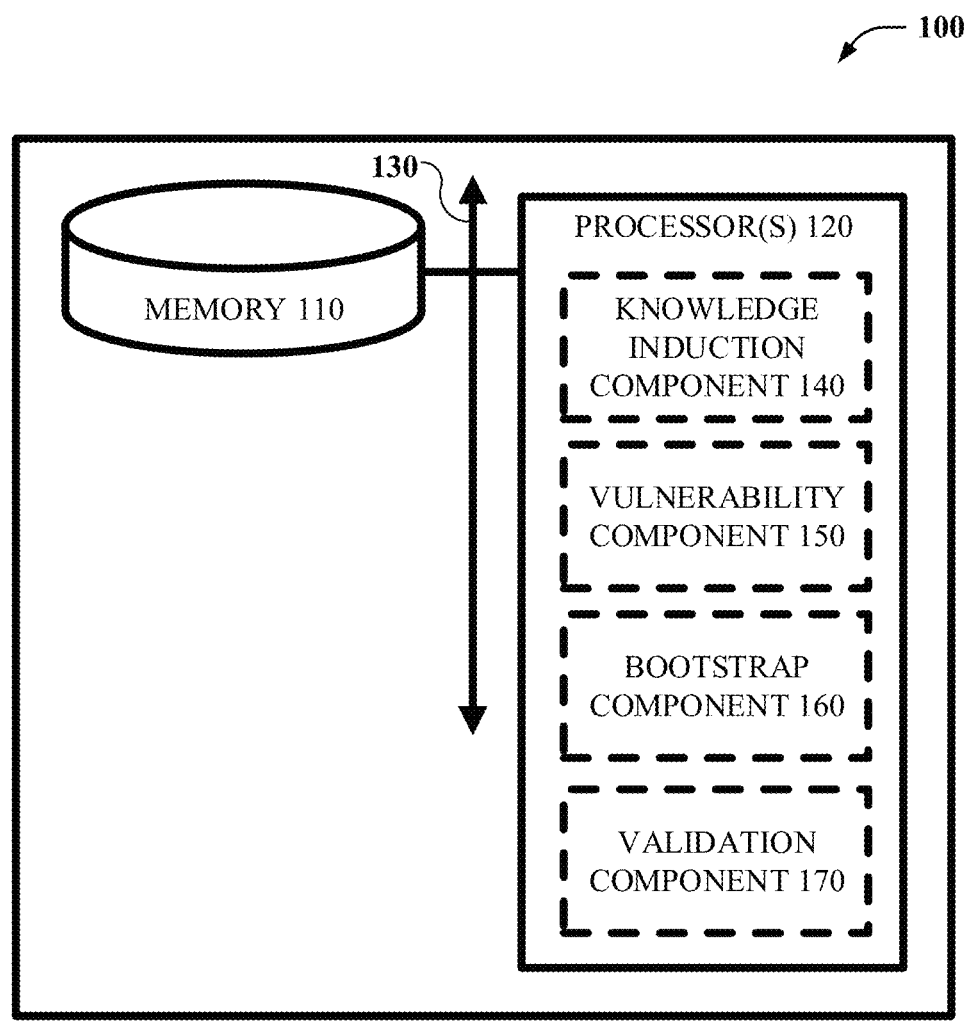
FIG. 1 illustrates a block diagram of an example, non-limiting system that can facilitate software vulnerability analysis using relationship data extracted from disparate data sources, in accordance with one or more embodiments described herein.

FIG. 1 illustrates a block diagram of an example, non-limiting system 100 that can facilitate software vulnerability analysis using relationship data extracted from disparate package-related sources, in accordance with one or more embodiments described herein. System 100 can include memory 110 for storing computer-executable components and one or more processors 120 operably coupled via one or more communication busses 130 to memory 110 for executing the computer-executable components stored in memory 110. As shown in FIG. 1, the computer-executable components can include knowledge induction component 140 and vulnerability component 150.

Knowledge induction component 140 can populate a package ontology for a range of software packages (packages) with relationship data extracted from a plurality of disparate package-related sources. The terms "software package" and "package" are used interchangeably herein unless the description expressly provides otherwise. A software package or package can include a set of code files that can be used to deploy software. A package can also include metadata, such the software's name, a description of the software's purpose, version number, vendor, checksum, and/or a list of dependencies involved in properly executing the software. Aspects of package ontologies, relationship data, and disparate package-related sources will be discussed in greater detail below with respect to FIG. 4.

In an embodiment, the plurality of disparate package-related data sources can comprise unstructured data. Data lacking a defined format or schema (e.g., unstructured text such as the body of an e-mail message, a web page, and/or a word-processor document) can be referred to as unstructured data. In an embodiment, the plurality of disparate package-related sources can include package documentation data, vulnerability descriptive data, code repository data, or a combination thereof. In an embodiment, knowledge induction component 140 can populate the package ontology with the relationship data by evaluating vulnerability descriptive data to identify sentences that reference terms indicative of vulnerabilities, as discussed in greater detail below with respect to FIG. 4. In an embodiment, knowledge induction component 140 can populate the package ontology with the relationship data by evaluating the sentences of vulnerability descriptive data to identify basic entities, as discussed in greater detail below with respect to FIG. 4. In an embodiment, knowledge induction component 140 can populate the package ontology with the relationship data by concatenating continuous sequences of noun phrases and/or identified basic entities within sentences of vulnerability descriptive data to build candidate N-gram entities, as discussed in greater detail below with respect to FIG. 4.

Vulnerability component 150 can identify an implicit vulnerability impacting the range of packages using the package ontology and a vulnerability record regarding an explicit vulnerability for a package within the range of packages, as discussed in greater detail below with respect to FIG. 4. In an embodiment, the relationship data can include intra-package relationship data, inter-package relationship data, or a combination thereof. Aspects of intra-package relationship data and inter-package relationship data will be discussed in greater detail below with respect to FIG. 4. In an embodiment, vulnerability component 150 can identify the implicit vulnerability by traversing the first and second knowledge graphs to identify another package within the range of packages that is dependent on a component of the package that is affected by the explicit vulnerability, as discussed in greater detail below with respect to FIG. 5.

In an embodiment, the computer-executable components stored in memory 110 can further include bootstrap component 160 and/or validation component 170. Bootstrap component 160 can bootstrap the package ontology using data mined from a curated knowledge graph, as described in greater detail below with respect to FIG. 4. Validation component 170 can modify the package ontology via a feedback mechanism, as described in greater detail below with respect to FIG. 6. The functionality of the computer-executable components utilized by the embodiments will be covered in greater detail below.

FIG. 2 illustrates an example, non-limiting data structure 200 that facilitates mapping between different package editions, in accordance with one or more embodiments described herein. One aspect of implicit vulnerabilities can involve hidden package relationships corresponding to different editions and/or versions of a given package. In particular, a software developer can produce multiple editions (or variants) of a given package with each edition providing a different combination of features. By way of example, data structure 200 of FIG. 2 includes two editions of a package: a Package ABC Enterprise Edition corresponding to column 210; and a Package GHI Edition corresponding to column 220. In this example, the Package ABC Enterprise Edition and the Package GHI Edition can represent different editions (or variants) of a package providing application server functionality (application server package). The Package ABC Enterprise Edition can represent a business edition of the application server package and the Package GHI Edition can represent a home edition of the application server package. One skilled in the art will appreciate that software developers can produce various different editions of a given package, such as a free or trial edition, a commercial edition, a professional edition, a student edition, a community edition, a standard edition, and/or other editions.

As different editions of the application server package, the Package ABC Enterprise Edition and the Package GHI Edition can each provide application server functionality. However, the business and home editions of the application server package can include different sets of components related to the application server functionality. For example, the home edition (e.g., the Package GHI Edition) of the application server package can include a first set of components that can implement core aspects of the application server functionality, such as a session management component and/or a client authentication component. In this example, the business edition (e.g., the Package ABC Enterprise Edition) can provide a second set of components that includes both the first set of components and additional components that are external to the first set of components. The additional components included in the second set of components can comprise a component that facilitates load balancing and/or a component that facilitates microservice applications.

FIG. 2 shows that hidden package relationships can result from software developers renaming one or more editions of a given package. For example, element 222 of data structure 200 shows an instance in which the software developer named the home edition of the application server package the Package ABC Home Edition. In contrast, element 224 of data structure 200 shows an instance in which the software developer named the home edition of the application server package the Package GHI Edition.

Software developers can modify instructions or data that a processor of a computing device executes to implement functionalities of a package over time for various reasons. Such modifications can be made to improve aspects of the package, fix bugs that cause the package to behave unexpectedly, implement new functionalities by the package, mitigate identified vulnerabilities, and/or other reasons. Implementing such modifications can change a state of the package. Software developers can utilize version control that facilitates managing change histories associated with a package to track modifications made to the package. Version control can involve assigning a unique version identifier (e.g., a version number and/or a version name) to a unique state of a package. For example, elements 211 and 212 of data structure 200 can correspond to unique states of Package ABC Enterprise Edition. Each unique state of this example can represent a different version of Package ABC Enterprise Edition. Element 212 can represent a version of Package ABC Enterprise Edition that the software developer released after making one or more modifications to a previous version of Package ABC Enterprise Edition that can be represented by element 211.

FIG. 2 further shows that hidden package relationships can result from different editions of a given package evolving differently over time as software developers make such modifications. In some instances, a software developer can make one or more modifications that changes a component included in one edition of a package having multiple editions that is not included in other editions of the package. The software developer can release an updated version of the edition of the package that includes the component changed by the modification while existing versions of the other editions of the package lacking that component can remain unchanged.

For example, element 212 is mapped to element 222 in data structure 200 to indicate that version 5.4 of Package ABC Enterprise Edition and version 6.5 of Package ABC Home Edition are compatible versions of the application server package. In this example, the respective versions of the Package ABC Enterprise Edition and the Package ABC Home Edition can be compatible in that components (e.g., the client authentication component) common to each edition can include all previously released modifications. While the mapping of element 212 to element 222 in data structure 200 indicates compatibility between the respective versions, the difference in version identifiers (e.g., version 5.4 and version 6.5) indicates that a number of modifications have been made to the Package ABC Home Edition that were not made to the Package ABC Enterprise Edition. As discussed above, the business edition (e.g., the Package ABC Enterprise Edition) of the application server package includes a component that facilitates load balancing whereas the home edition (e.g., the Package ABC Home Edition and/or the Package GHI Edition) lacks that component. Therefore, at least a subset of the difference in version identifiers can be related to updated versions of the Package ABC Enterprise Edition that include modifications made to the component that facilitates load balancing. To the extent that the Package ABC Home Edition lacks the component that facilitates load balancing, existing versions of the Package ABC Home Edition can remain unchanged by any modifications made to that component.

FIG. 3 illustrates example, non-limiting vulnerability descriptive data 300, in accordance with one or more embodiments described herein. As shown by FIG. 3, vulnerability descriptive data 300 can include natural language (e.g., human-readable) text describing a known software vulnerability issue regarding a package 330. A vulnerability record comprising vulnerability descriptive data 300 can include a package identifier associated with package 330. The vulnerability record thereby relates an impact of the known software vulnerability issue described by vulnerability descriptive data 300 with package 330 at large. However, in describing the known software vulnerability issue, the natural language text of vulnerability descriptive data 300 identifies a particular subset of components (e.g., components 310, 320, 340, and 350) comprising package 330 as actually being impacted by that vulnerability issue. Other components of package 330 can be unimpacted by the known software vulnerability issue described by vulnerability descriptive data 300.

Figure 4:
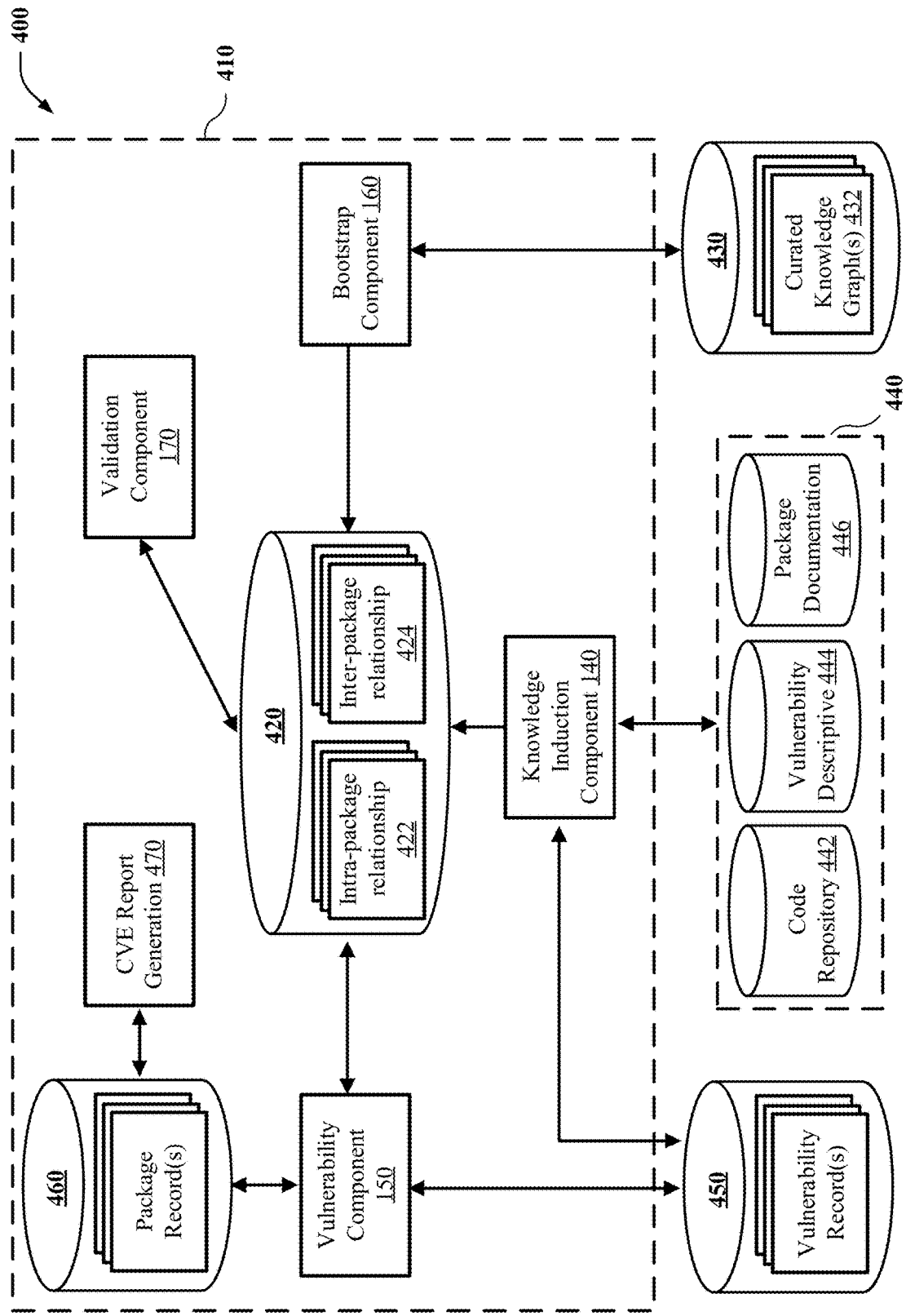
FIG. 4 illustrates an example, non-limiting framework that can facilitate software vulnerability analysis using fragmented sources of relationship data, in accordance with one or more embodiments described herein.

FIG. 4 illustrates an example, non-limiting framework 400 that can facilitate software vulnerability analysis using fragmented sources of relationship data, in accordance with one or more embodiments described herein. Framework 400 can include vulnerability analysis pipeline 410 that leverages a package ontology 420 for a range of packages to mitigate vulnerabilities impacting the range of packages. In the context of packages, a vulnerability generally denotes, but is not limited to, a flaw or mistake in computational logic in packages that can be exploited to violate a security policy of a computing environment executing the packages. Security policy violations can include, but are not limited to: executing commands as another entity; accessing data contrary to access restrictions; posing as another entity; conducting a denial of service attack; and/or other security policy violations.

Package ontology 420 can include domain knowledge regarding the range of packages used in a defined computing environment, such as a managed information technology (IT) environment of an enterprise or a subset of the managed IT environment. Relationship data corresponding to dependency relationships associated with the range of packages can be captured within the domain knowledge of package ontology 420. That relationship data can include intra-package relationship data 422 and inter-package relationship data 424. Intra-package relationship data 422 can include leader-follower relationships (or part-of relationships) that exist between components and/or sub-components comprising a given package within the range of packages. Inter-package relationship data 424 can include dependency relationships that exist between different packages within the range of packages and/or dependency relationships that exist between respective components of those different packages.

By way of example, the range of packages can include a first package and a second package. The first package can include component-A and component-B. The second package can include component-C and component-D. Component-B of the first package can generate an output corresponding to a functionality of the first package based on data generated by component-A. Intra-package relationship data 422 can include the dependency relationship that exists between component-A and component-B of the first package. Component-D of the second package can generate an output corresponding to a functionality of the second package based on both data generated by component-C of the second package and data generated by component-B of the first package. Intra-package relationship data 422 can include the dependency relationship that exists between component-C and component-D of the second package. Inter-package relationship data 424 can include the dependency relationship that exists between component-B of the first package and component-D of the second package.

In an embodiment, leader-follower relationships can involve an organizational approach rather than any sense of dependency relationship. Stated differently, intra-package relationships, especially of the type package-component (e.g., leader-follower) can involve an approach to organize components of a large package. One example is the package Spring Framework. The Spring Framework package is a relatively large software package comprising many sub-components, such as Spring Boot and Spring WebFlux. Customer A may use Spring Boot but not Spring WebFlux. Customer B may use Spring WebFlux and not Spring Boot. NIST reports security vulnerabilities on packages only, Spring Framework as a whole. However, while a vulnerability on Spring Framework can apply to Spring Boot, that vulnerability can be inapplicable to Spring WebFlux. A more targeted identification of which component is affected by a security vulnerability can be made by identifying package-component relationships. By way of example, if a vulnerability on Spring Framework is actually on Spring WebFlux only (e.g., this can be determined by analyzing the text description of the vulnerability), then a customer using only the Spring Boot component of Spring Framework need not be concerned about upgrading the Spring Boot component. The example relationship between Spring Framework and Spring Boot is purely organizational—as in a taxonomy with part-of relationships. There is no real dependency between the two components.

Knowledge induction component 140 can populate packet ontology 420 with relationship data extracted from disparate package-related sources 440. Disparate package-related sources 440 generally represent, but are not limited to, fragmented sources of data concerning packages in the package inventory. In an embodiment, the disparate package-related sources 440 can comprise unstructured data or data lacking a defined format or schema. As shown by FIG. 4, disparate package-related sources 440 can include code repository data 442, vulnerability descriptive data 444, and/or package documentation data 446.

Code repository data 442 can include a repository storing sets of files (e.g., components) comprising a project (e.g., a package) and/or historical data regarding changes made to files in a given set of files. To that end, a repository can comprise metadata for a set of files or a directory structure. Such metadata can include: a historical record of changes in the repository, a set of commit objects, and/or a set of heads or references to commit objects. An example repository is discussed in greater detail below with respect to FIG. 6. Example sources of code repository data 442 can include: the GitHub repository platform (available from GitHub, Inc. of San Francisco, Calif.) and/or other sources of code repository data 442.

Vulnerability descriptive data 444 can include natural language text describing known software vulnerability issues regarding packages. Example sources of vulnerability descriptive data 444 can include: Common Vulnerabilities and Exposures (CVE) data (available from the MITRE® Corp. of McLean, Va.), the National Vulnerability Database (NVD) maintained by the National Institute of Standards and technology (NIST), software developer (or vendor) vulnerability databases, crowd-sourced vulnerability databases, and/or other sources of vulnerability descriptive data 444.

Package documentation data 446 can include natural language text and/or image data that provides information regarding the development, operation, and/or use of a given package or a component/subcomponent of the given package. Such information can include: architectural documentation that describes aspects of how one or more components of a given package interact to implement a functionality of the given package; technical documentation that describes operation of code, algorithms, interfaces, and/or application programming interfaces (APIs) that implement a functionality of the given package; and/or user documentation that describes how an end-user or system administrator can interact with the given package. In some instances, package documentation data 446 for a given package can be generated by a software developer that created the given package or one or more components/subcomponents of the given package. Example sources of package documentation data 446 can include inline comments in source code of a given package; a website of a software developer involved in creating the given package; a database storing source code of the given package; and/or other sources of package documentation data 446.

One aspect of populating package ontology 420 with relationship data can involve knowledge induction component 140 performing tokenization on a particular instance of vulnerability descriptive data 444. To that end, knowledge induction component 140 can parse natural language text of the particular instance that describes a known software vulnerability issue to split that natural language text into a set of sentences. Knowledge induction component 140 can evaluate the set of sentences to identify a subset of sentences within the set of sentences that include or reference terms indicative of vulnerabilities. Examples of such terms indicative of vulnerabilities can include: "vulnerability"; "flaw"; "overflow"; and/or other terms indicative of vulnerabilities. In an embodiment, identifying the subset of sentences can comprise knowledge induction component 140 utilizing a deep parsing model, a dependency parsing model, a part-of-speech (POS) tagging model, or a combination thereof. In an embodiment, identifying the subset of sentences can comprise knowledge induction component 140 utilizing a machine learning model (e.g., a Word2Vec model) to identify synonyms of terms indicative of vulnerabilities.

In an embodiment, identifying sentences that include terms indicative of vulnerabilities can comprise knowledge induction component 140 performing lemmatization on one or more words in the sentences. Lemmatization can involve converting a word into a base form. For example, a sentence in the set of sentences can include the word "flaws". In this example, lemmatization can involve knowledge induction component 140 converting the word "flaws" into a base form of "flaw". By lemmatizing words, knowledge induction component 140 can consider different variations of a given word as multiple instances of the same given word to facilitate evaluating vulnerability descriptive data 444.

Knowledge induction component 140 can evaluate the subset of sentences that include or reference terms indicative of vulnerabilities to identify basic entities. With reference to FIG. 7, the words "XT", "library", "Windowing", and "System" of component 724 can be identified as basic entities. With reference to FIG. 4 and in an embodiment, knowledge induction component 140 can identify the basic entities utilizing noun phrase labels (e.g., common noun (NP) labels and/or proper noun (NNP) labels) in parser model output data, POS tags, or a combination thereof. In an embodiment, knowledge induction component 140 can identify the basic entities utilizing entity labels assigned to words of the subset of sentences by a Named Entity Recognition (NER) component of a spaCy parser model. In an embodiment, knowledge induction component 140 can identify basic entities using tags assigned to words of the subset of sentences by a natural language understanding (NLU) service (available from International Business Machines Corporation of Armonk, N.Y.).

Knowledge induction component 140 can concatenate a continuous sequence of noun phrases and/or identified basic entities within the subset of sentences to build a set of candidate N-gram entities. To that end, knowledge induction component 140 can generate a first candidate N-gram entity for the set of candidate N-gram entities by concatenating the first two words in the continuous sequence of noun phrases and/or identified basic entities. Knowledge induction component 140 can continue to generate additional candidate N-gram entities of varying lengths for the set of candidate N-gram entities. The continuous sequence of noun phrases and/or identified basic entities can precede a word of a respective sentence that is neither a noun phrase nor an identified basic entity. Upon encountering that word, knowledge induction component 140 can cease generating additional candidate N-gram entities for the set of N-gram entities.

Continuing with the example above with reference to component 724 of FIG. 7, a set of candidate N-gram entities built by knowledge induction component 140 using the sentence of vulnerability descriptive data 720 comprising component 724 can include four candidate N-gram entities. Those four candidate N-gram entities can include: "XT library"; "XT library of X"; "XT library of X Windowing"; and/or "XT library of X Windowing System". Upon encountering the word "allows" that follows "System" in the sentence of vulnerability descriptive data 720 comprising component 724, knowledge induction component 140 can cease generating additional candidate N-gram entities for the set of candidate N-gram entities.

Each candidate N-gram entity in a given set of candidate N-gram entities can represent a potential component of a given package associated with the particular instance of vulnerability descriptive data 444. In an embodiment, knowledge induction component 140 can assign a confidence score to a candidate N-gram entity of the given set of candidate N-gram entities. The confidence score can quantify a likelihood that the candidate N-gram entity is an actual component of the given package. In an embodiment, knowledge induction component 140 can assign the confidence score to the candidate N-gram entity using a frequency analysis. In this embodiment, the frequency analysis can include knowledge induction component 140 accessing vulnerability record database 450 to identify a set of vulnerability records that have package identifiers associated with the given package. Knowledge induction component 140 can evaluate the set of vulnerability records to determine the number of times that the candidate N-gram entity occurs in vulnerability descriptive data comprising the set of vulnerability records. A confidence score that knowledge induction component 140 assigns to one candidate N-gram entity occurring more frequently in such vulnerability descriptive data can be higher than a confidence score that knowledge induction component 140 assigns to another candidate N-gram entity occurring less frequently in such vulnerability descriptive data.

Vulnerability component 150 can identify one or more implicit vulnerabilities impacting the range of packages using package ontology 420 and one or more vulnerability records of vulnerability record database 450. A vulnerability record of vulnerability record database 450 can include vulnerability descriptive data regarding an explicit vulnerability for a given package within the range of packages. As used herein, an "explicit vulnerability" denotes a vulnerability that vulnerability descriptive data of a vulnerability record expressly describes as impacting a given package. The vulnerability record can have a package identifier associated with the given package. As used herein, an "implicit vulnerability" denotes a vulnerability that impacts a range of packages but lacks express description in vulnerability descriptive data comprising vulnerability records associated with the range of package.

Vulnerability component 150 can further populate package records of package database 460 with enhanced vulnerability information regarding the range of packages that can include both explicit vulnerabilities and implicit vulnerabilities. A package record of package database 460 can be populated with enhanced vulnerability information for a given package within the range of packages. Vulnerability component 150 can identify a set of vulnerability records in vulnerability record database 450 that relate to the given package using package identifiers. Vulnerability component 150 can populate a portion of the enhanced vulnerability information relating to explicit vulnerabilities impacting the given package by parsing vulnerability descriptive data comprising the set of vulnerability records.

As discussed above with respect to FIG. 3, vulnerability records can define vulnerability impact at package-level granularity by indexing vulnerabilities using package identifiers. That is, a vulnerability record having a package identifier associated with a given package can define a particular vulnerability as impacting the given package. In as much as that vulnerability record can be indexed in vulnerability record database 450 using the package identifier, the particular vulnerability can be identified as being applicable to the given package at large. However, vulnerability descriptive data of the vulnerability record can describe the particular vulnerability as impacting one or more components of the given package.

Vulnerability component 150 can leverage one or more natural language processing (NLP) techniques discussed above with respect to knowledge induction component 140 to determine an impact of the particular vulnerability at component-level granularity. By evaluating the natural language text comprising the vulnerability descriptive data, vulnerability component 150 can determine a subset of components comprising the given package that are actually impacted by the particular vulnerability. Vulnerability component 150 can utilize relationship data of package ontology 420 to identify implicit vulnerabilities by determining dependency relationships between the subset of components and/or other components. For example, those other components can include: one or more components of the given package that are not identified in the vulnerability descriptive data; one or more components of other packages within the range of packages that are not associated with the package identifier of the vulnerability record; or a combination thereof. Vulnerability component 150 can populate portions of enhanced vulnerability information in package records in package database 460 that are associated with such other components with the identified implicit vulnerabilities.

In an embodiment, relationship data of package ontology 420 can include a first knowledge graph comprising intra-package relationship data 422 and a second knowledge graph comprising inter-package relationship data 424. In an embodiment, vulnerability component 150 can identify an implicit vulnerability by traversing the first knowledge graph and/or the second knowledge graph to identify another package within the range of packages that is dependent on a component in the subset of components that is affected by the explicit vulnerability.

Figure 5:
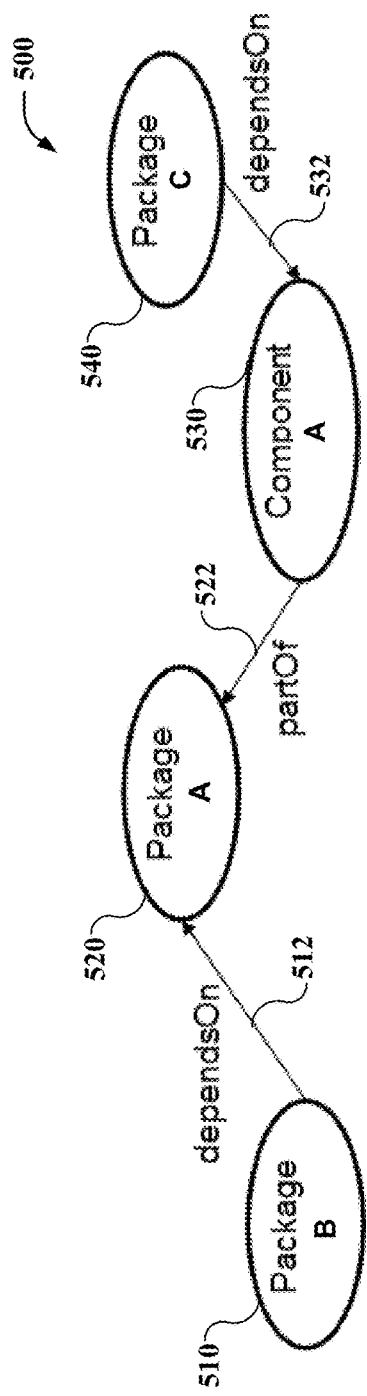
FIG. 5 illustrates an example, non-limiting knowledge graph, in accordance with one or more embodiments described herein.

By way of example and with reference to FIG. 5, identification of an implicit vulnerability by vulnerability component 150 can involve vulnerability component 150 identifying a particular package from a given vulnerability record using metadata (e.g., a package identifier and/or NIST metadata) of the given vulnerability record. In this example, vulnerability component 150 can identify Package A corresponding to node 520 from the given vulnerability record using the metadata. Vulnerability component 150 can transitively traverse one or more knowledge graphs (e.g., knowledge graph 500) to identify any packages that depend on Package A. Vulnerability component 150 can identify Package B that corresponds to node 510 as depending on Package A by transitively traversing knowledge graph 500. For example, vulnerability component 150 can identify Package B by evaluating metadata of edge 512 that indicates a dependency of Package B on Package A. In an embodiment, node 510, node 520, and edge 512 can comprise a knowledge graph that includes inter-package relationship data 424. Upon identifying Package B, vulnerability component 150 can populate package database 460 with implicit vulnerability information that associates Package B with a particular vulnerability expressed by the given vulnerability record.

Continuing with this example, vulnerability component 150 can also evaluate knowledge graph 500 to identify a set of components affected by the particular vulnerability expressed by the given vulnerability record. For example, vulnerability component 150 can evaluate metadata of edge 522 that indicates Component A of node 530 is a part of Package A. Vulnerability component 150 can include Component A in the set of components affected by the particular vulnerability expressed by the given vulnerability record. In an embodiment, node 520, node 530, and edge 522 can comprise a knowledge graph that includes intra-package relationship data 422. For each component (e.g., Component A) in the set of components, vulnerability component 150 can traverse knowledge graph 500 to identify any other packages (external to Package A) that depend on that component. In FIG. 5, vulnerability component 150 can identify Package C of node 540 as depending on Component A by evaluating metadata of edge 532 that indicates a dependency of Package C on Component A. Upon identifying Package C, vulnerability component 150 can populate package database 460 with implicit vulnerability information that associates Package C with the particular vulnerability expressed by the given vulnerability record. In an embodiment, vulnerability component 150 can transitively traverse knowledge graph 500 to identify any packages that depend on Package C. In this embodiment, vulnerability component 150 can populate package database 460 with implicit vulnerability information that associates any such package identified as depending on Package C with the particular vulnerability expressed by the given vulnerability record.

Vulnerability component 150 can leverage one or more natural language processing (NLP) techniques discussed above with respect to knowledge induction component 140 to determine an impact of the particular vulnerability at component-level granularity.

With reference to FIG. 4, bootstrap component 160 can bootstrap package ontology 420 using data mined from a curated knowledge graph 432 stored in a multi-domain knowledge base 430 (e.g., Wikidata, DBpedia, and/or other multi-domain knowledge bases). To that end, bootstrap component 160 can access package database 460 to obtain a package inventory comprising the range of packages used in the defined computing environment. Bootstrap component 160 can use the package inventory to identify entities (relevant entities) of the curated knowledge graph 432 that are relevant to packages in the package inventory. In an embodiment, bootstrap component 160 can identify relevant entities by traversing links of curated knowledge graph 432. The data that bootstrap component 160 mines from curated knowledge graph 432 can include information identifying, at least, a subset of components (or subcomponents) comprising one or more packages of the package inventory.

Validation component 170 can modify package ontology 420 via one or more feedback mechanisms. In an embodiment, the one or more feedback mechanisms can include filtering a candidate N-gram entity from a set of candidate N-gram entities to exclude the candidate N-gram entity from relationship data comprising package ontology 420. In an embodiment, validation component 170 can filter the candidate N-gram entity from the set of candidate N-gram entities using a confidence score that knowledge induction component 140 assigned to the candidate N-gram entity. For example, validation component 170 can filter the candidate N-gram entity from the set of candidate N-gram entities when the confidence score does not satisfy a defined threshold score. Alternatively, validation component 170 can refrain from filtering the candidate N-gram entity from the set of candidate N-gram entities when the confidence score satisfies the defined threshold score.

In an embodiment, validation component 170 can filter the candidate N-gram entity from the set of candidate N-gram entities by submitting a query comprising the candidate N-gram entity to a multi-domain knowledge base 430. In this embodiment, validation component 170 can exclude the candidate N-gram entity when a response to the query indicates that a curated knowledge graph 432 stored in multi-domain knowledge base 430 lacks a match for the candidate N-gram entity. Alternatively, validation component 170 can include the candidate N-gram entity when a response to the query indicates that a match exists for the candidate N-gram entity within a curated knowledge graph 432 stored in multi-domain knowledge base 430.

In an embodiment, misspelled words in vulnerability descriptive data can negatively impact the accuracy of relationship data populating package ontology 420. For example, validation component 170 can erroneously exclude a candidate N-gram entity from relationship data comprising package ontology 420 when a query submitted to multi-domain knowledge base 430 includes a misspelled word. In this embodiment, validation component 170 can utilize a machine learning model to pre-process a query prior to submission. The machine learning model can evaluate a candidate N-gram entity using distance metrics (e.g., cosine similarity).

CVE report generation process 470 can process queries related to vulnerabilities impacting the range of packages and generate reports comprising enhanced vulnerability information responsive to such queries. By way of example, CVE report generation process 470 can receive a query requesting vulnerability information regarding a given package within the range of packages. In response to that query, CVE report generation process 470 can identify a package record stored in package database 460 that can include a package identifier associated with the given package. CVE report generation process 470 can generate a report comprising enhanced vulnerability information for the query. The report can include information regarding one or more explicit vulnerabilities impacting the given package that vulnerability component 150 obtained from vulnerability records of vulnerability record database 450. The report can further include information regarding one or more implicit vulnerabilities impacting the given package that vulnerability component 150 generated using package ontology 420.

Figure 6:
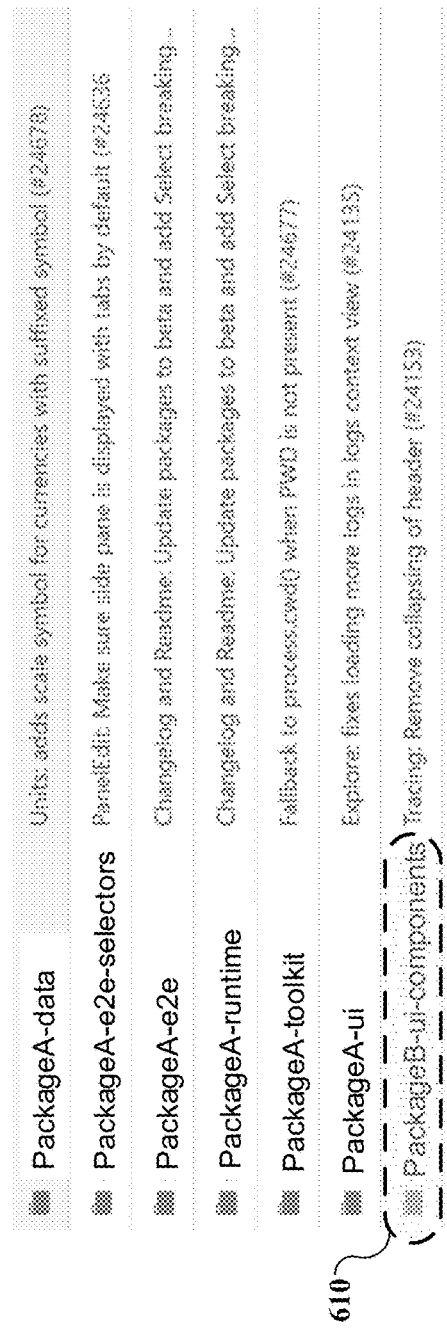
FIG. 6 illustrates an example, non-limiting repository, in accordance with one or more embodiments described herein.

FIG. 6 illustrates an example, non-limiting repository 600, in accordance with one or more embodiments described herein. Software repositories like repository 600 provide a storage location for packages. As shown by FIG. 6, repository 600 can include a folder structure that facilitates organizing a set of code files and/or other data comprising a package. Repository 600 can provide some relationship data regarding the package. For example, folder 610 of repository 600 is named "PackageB-ui-components". In an embodiment, knowledge induction component 140 can leverage a software dependency discovery tool (e.g., GitLab available from GitLab Inc. of San Francisco, Calif.) to analyze repository 600 to discover inter-package dependencies where the target package (e.g., PackageB-ui-components) is a well-known package. In an embodiment, knowledge induction component 140 can evaluate the contents of folder 610 to identify candidate N-gram entities that each potentially correspond to a component of PackageB.

FIGS. 7-8 illustrate example, non-limiting vulnerability records, in accordance with one or more embodiments described herein. With reference to FIG. 7, vulnerability record 700 can include a package identifier 710 and vulnerability descriptive data 720 that can include natural language text describing a known software vulnerability issue regarding a package (e.g., "AIX 3.2") associated with package identifier 710. Vulnerability descriptive data 720 can include a term 722 (e.g., "overflow") indicative of vulnerability and a component 724 (e.g., "Xt library of X Windowing System") of the package that can be impacted by the known software vulnerability issue.

With reference to FIG. 8, vulnerability record 800 can include a package identifier 810 and vulnerability descriptive data 820 that includes natural language text describing a known software vulnerability issue regarding a package (e.g., "tivoli_asset_management_for_it 7.2") associated with package identifier 810. Vulnerability descriptive data 820 can include a term 822 (e.g., "vulnerability") indicative of vulnerability and a component 824 (e.g., "Start Center Layout and Configuration component") of the package that can be impacted by the known software vulnerability issue.

Figure 9:
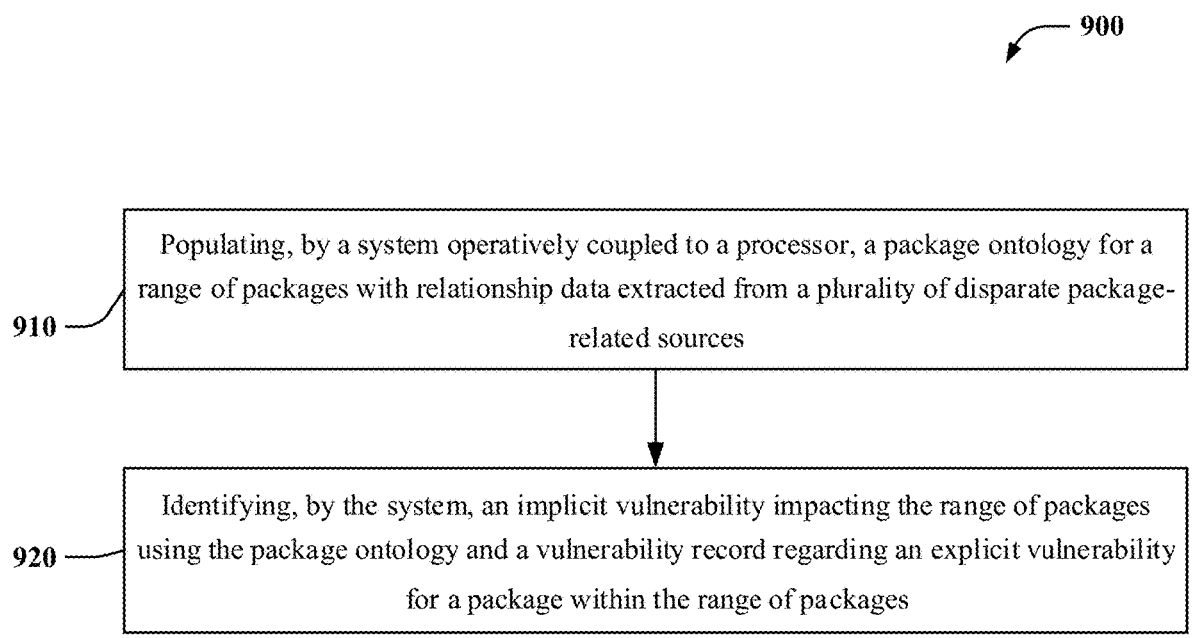
FIG. 9 illustrates a flow diagram of an example, non-limiting computer-implemented method of facilitating software vulnerability analysis using relationship data extracted from disparate data sources, in accordance with one or more embodiments described herein.

FIG. 9 illustrates a flow diagram of an example, non-limiting computer-implemented method 900 of facilitating software vulnerability analysis using relationship data extracted from disparate package-related sources, in accordance with one or more embodiments described herein. Repetitive description of like elements employed in other embodiments described herein is omitted for sake of brevity.

At 910, the computer-implemented method 900 can comprise populating, by a system operatively coupled to a processor (e.g., with knowledge induction component 140), a package ontology for a range of packages with relationship data extracted from a plurality of disparate package-related sources. In an embodiment, the plurality of disparate package-related sources can include package documentation data, vulnerability descriptive data, code repository data, or a combination thereof. In an embodiment, the system can populate the package ontology with the relationship data by evaluating sentences of vulnerability descriptive data to identify basic entities. In an embodiment, the sentences of vulnerability descriptive data can comprise terms indicative of vulnerabilities. In an embodiment, the system can populate the package ontology with the relationship data by concatenating continuous sequences of noun phrases and/or identified basic entities within sentences of vulnerability descriptive data to build candidate N-gram entities.

At 920, the computer-implemented method 900 can comprise identifying, by the system (e.g., with vulnerability component 150), an implicit vulnerability impacting the range of packages using the package ontology and a vulnerability record regarding an explicit vulnerability for a package within the range of packages. In an embodiment, the relationship data can include a first knowledge graph comprising intra-package relationship data and a second knowledge graph comprising inter-package relationship data. In an embodiment, the system can identify the implicit vulnerability by traversing the first and second knowledge graphs to identify another package within the range of packages that is dependent on a component of the package that is affected by the explicit vulnerability.

Figure 10:
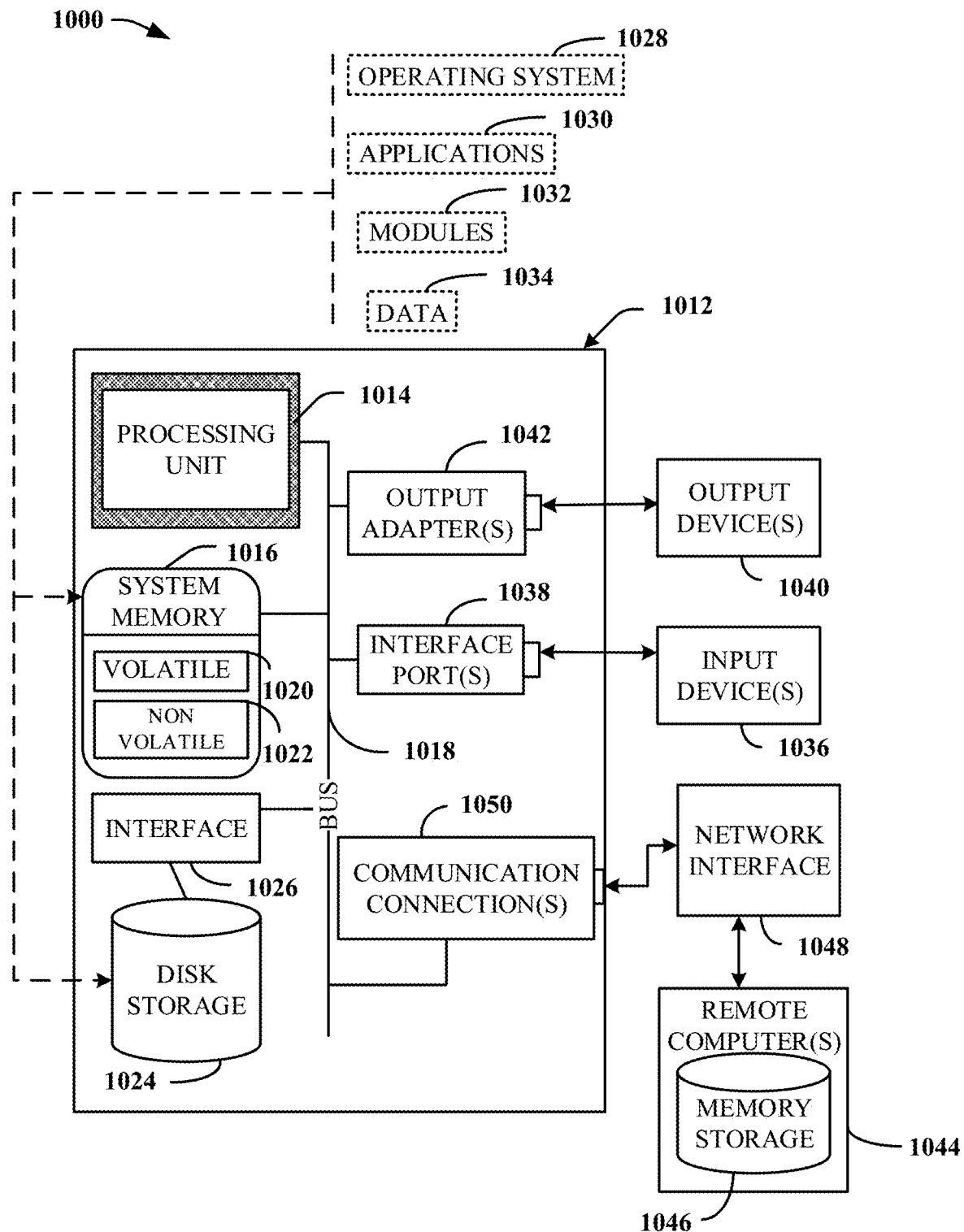
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device (s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device (s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It can be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor-based appliance, a peer device or other common network node and the like, and typically can also include many or the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc.

that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes the following computer-executable components stored in memory:
    a knowledge induction component that populates a package ontology for a range of packages with relationship data extracted from a plurality of disparate package-related sources; and
    a vulnerability component that identifies an implicit vulnerability impacting the range of packages using the package ontology and a vulnerability record regarding an explicit vulnerability for a package within the range of packages, wherein the knowledge induction component populates the package ontology with the relationship data by concatenating continuous sequences of noun phrases and identified basic entities within sentences of vulnerability descriptive data to build candidate N-gram entities.

2. The system of claim 1, wherein the plurality of disparate package-related data sources comprises unstructured data.

3. The system of claim 1, wherein the plurality of disparate package-related sources includes package documentation data, vulnerability descriptive data, code repository data, or a combination thereof.

4. The system of claim 1, wherein the knowledge induction component populates the package ontology with the relationship data by evaluating vulnerability descriptive data to identify sentences that reference terms indicative of vulnerabilities.

5. The system of claim 1, wherein the knowledge induction component populates the package ontology with the relationship data by evaluating sentences of vulnerability descriptive data to identify basic entities, and wherein the sentences of vulnerability descriptive data comprise terms indicative of vulnerabilities.

6. The system of claim 1, and wherein the sentences of vulnerability descriptive data comprise terms indicative of vulnerabilities.

7. The system of claim 1, wherein the relationship data includes intra-package relationship data, inter-package relationship data, or a combination thereof.

8. The system of claim 1, wherein the relationship data includes a first knowledge graph comprising intra-package relationship data and a second knowledge graph comprising inter-package relationship data.

9. The system of claim 8, wherein the vulnerability component identifies the implicit vulnerability by traversing the first and second knowledge graphs to identify another package within the range of packages that is dependent on a component of the package that is affected by the explicit vulnerability.

10. The system of claim 1, further comprising:
    a bootstrap component that bootstraps the package ontology using data mined from a curated knowledge graph.

11. The system of claim 1, further comprising:
    a validation component that modifies the package ontology via a feedback mechanism.

12. A computer-implemented method, comprising:
    populating, by a system operatively coupled to a processor, a package ontology for a range of packages with relationship data extracted from a plurality of disparate package-related sources; and
    identifying, by the system, an implicit vulnerability impacting the range of packages using the package ontology and a vulnerability record regarding an explicit vulnerability for a package within the range of packages, wherein the system populates the package ontology with the relationship data by concatenating continuous sequences of noun phrases and identified basic entities within sentences of vulnerability descriptive data to build candidate N-gram entities.

13. The computer-implemented method of claim 12, wherein the plurality of disparate package-related sources includes package documentation data, vulnerability descriptive data, code repository data, or a combination thereof.

14. The computer-implemented method of claim 12, wherein the system populates the package ontology with the relationship data by evaluating sentences of vulnerability descriptive data to identify basic entities, and wherein the sentences of vulnerability descriptive data comprise terms indicative of vulnerabilities.

15. The computer-implemented method of claim 12, wherein the sentences of vulnerability descriptive data comprise terms indicative of vulnerabilities.

16. The computer-implemented method of claim 12, wherein the relationship data includes a first knowledge graph comprising intra-package relationship data and a second knowledge graph comprising inter-package relationship data.

17. The computer-implemented method of claim 16, wherein the system identifies the implicit vulnerability by traversing the first and second knowledge graphs to identify another package within the range of packages that is dependent on a component of the package that is affected by the explicit vulnerability.

18. A computer program product comprising a computer readable storage medium having program instructions embodied therewith, the program instructions executable by a processor to cause the processor to:
    populate, by the processor, a package ontology for a range of packages with relationship data extracted from a plurality of disparate package-related sources; and
    identify, by the processor, an implicit vulnerability impacting the range of packages using the package ontology and a vulnerability record regarding an explicit vulnerability for a package within the range of packages, wherein the processor populates the package ontology with the relationship data by concatenating continuous sequences of noun phrases and identified basic entities within sentences of vulnerability descriptive data to build candidate N-gram entities.

19. The computer program product of claim 18, wherein the sentences of vulnerability descriptive data comprise terms indicative of vulnerabilities.

20. The computer program product of claim 18, wherein the relationship data includes a first knowledge graph comprising intra-package relationship data and a second knowledge graph comprising inter-package relationship data, and wherein the processor identifies the implicit vulnerability by traversing the first and second knowledge graphs to identify another package within the range of packages that is dependent on a component of the package that is affected by the explicit vulnerability.

* * * * *